I. H. DAVIS.
SAFETY BRAKE FOR MOTOR VEHICLES.
APPLICATION FILED MAR. 14, 1916.
1,248,630.
Patented Dec. 4, 1917.
3 SHEETS—SHEET 2.
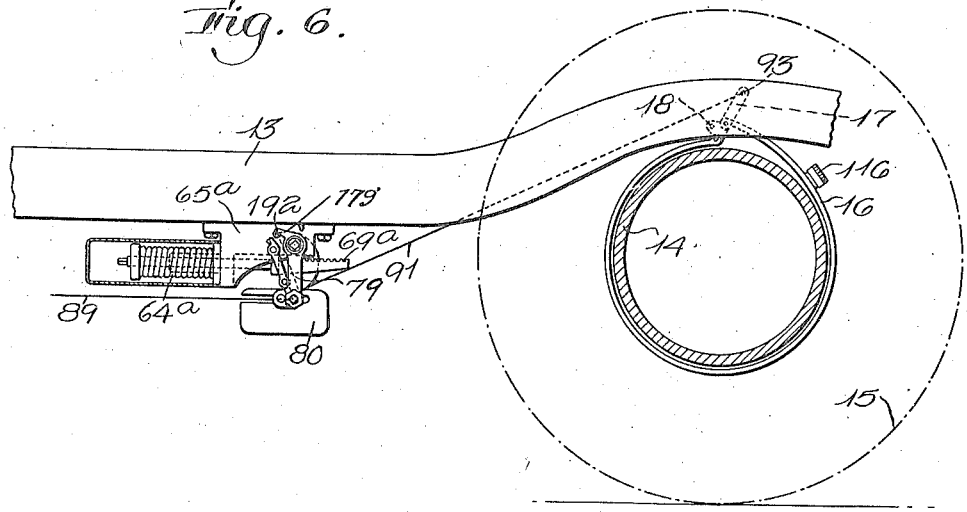
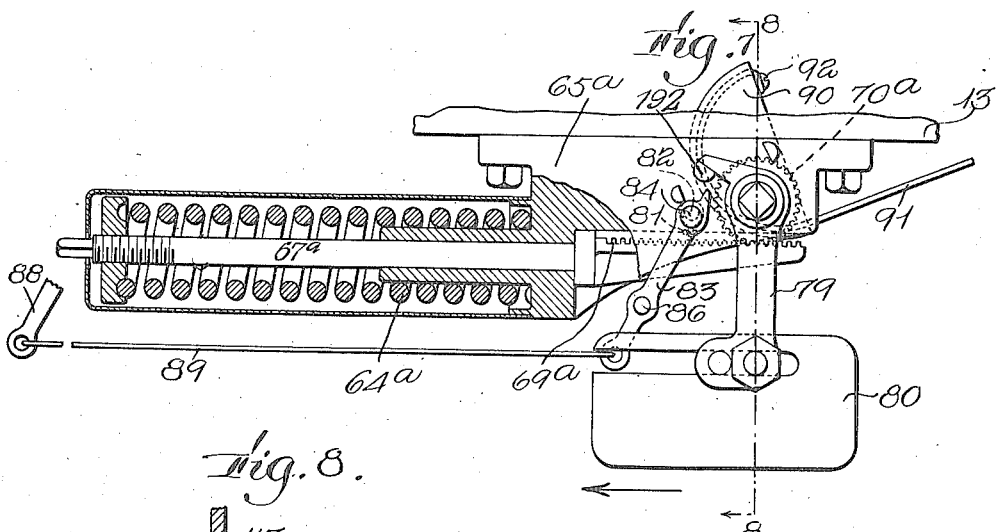
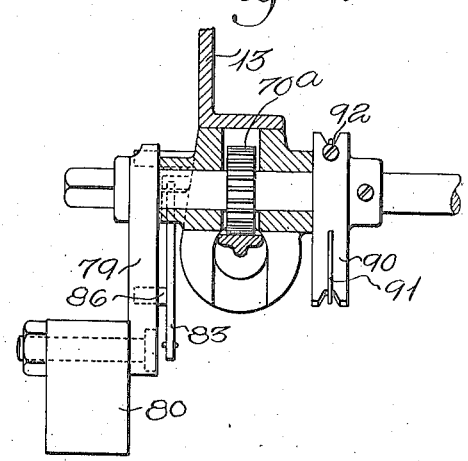
Inventor:
I. H. Davis
by Wright Brown Quinby May
Attorneys.

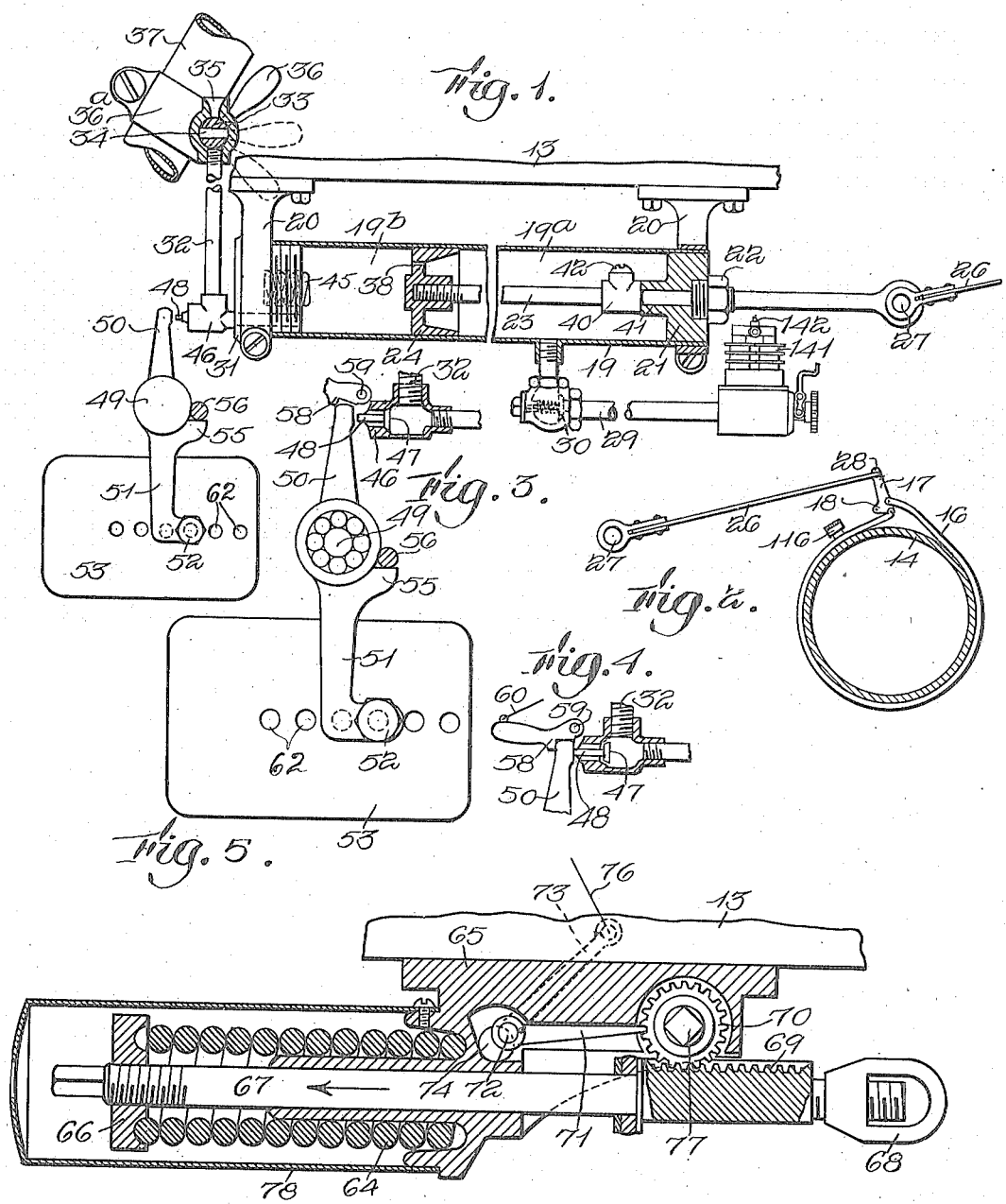

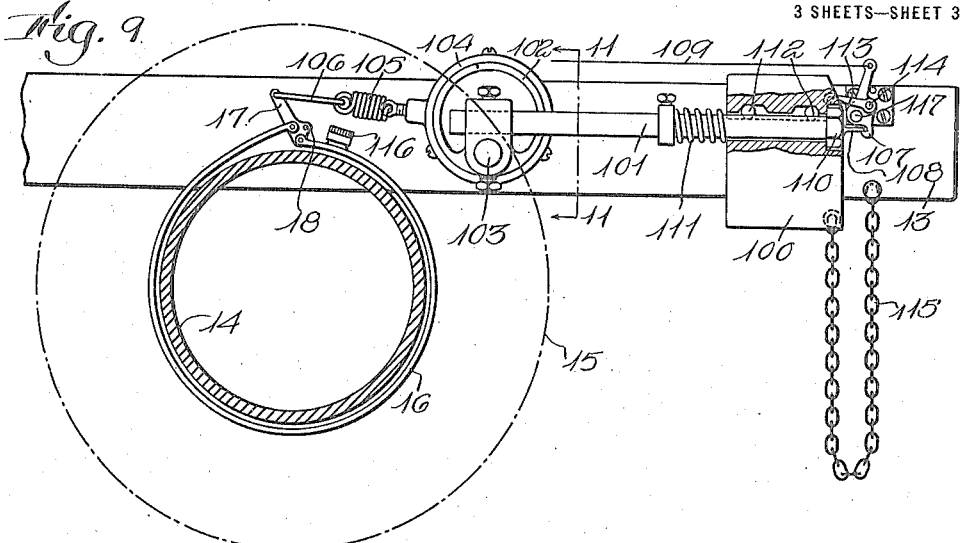
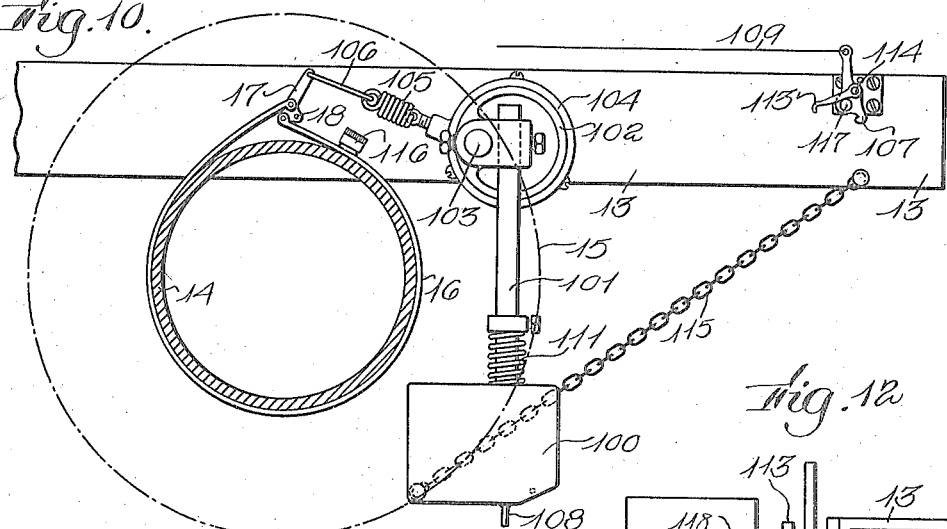
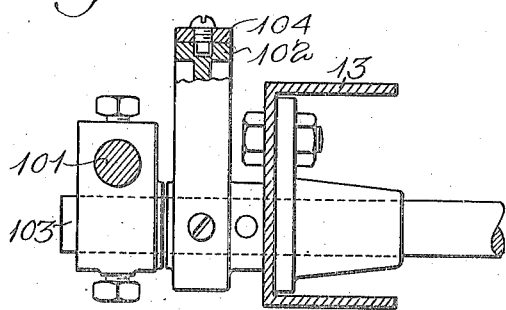
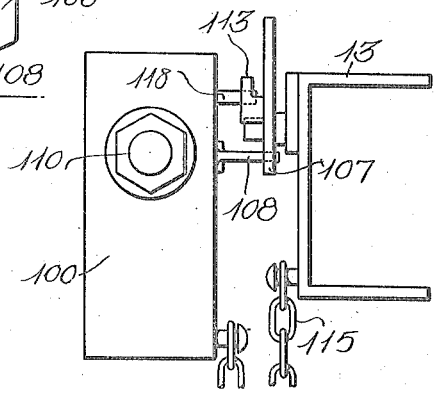

UNITED STATES PATENT OFFICE.

ISAAC H. DAVIS, OF BOSTON, MASSACHUSETTS, ASSIGNOR OF ONE-HALF TO HENRY H. WESTINGHOUSE, OF NEW YORK, N. Y.

SAFETY-BRAKE FOR MOTOR-VEHICLES.

1,248,630.

Specification of Letters Patent.   Patented Dec. 4, 1917.

Application filed March 14, 1916.   Serial No. 84,173.

*To all whom it may concern:*

Be it known that I, ISAAC H. DAVIS, a citizen of the United States, residing at Boston, in the county of Suffolk and State of Massachusetts, have invented new and useful Improvements in Safety-Brakes for Motor-Vehicles, of which the following is a specification.

This invention relates to a motor vehicle with the driving wheels of which are associated suitable brakes, each usually including a circular rotating member or drum attached to the wheel, and a non-rotating member, such as a band normally out of contact with the rotary member and movable to frictionally engage the latter.

My invention has for its object to enable the brakes of a motor vehicle to be operated much more quickly than heretofore and by power stored on the vehicle and adapted to be rendered instantaneously available to set the brakes without the exertion of any appreciable amount of muscular force, my aim being to set the brakes so quickly that the vehicle may be stopped in a very small fraction of the time now required, thus eliminating to a large extent the dangers to life, limb, and property involved by the present methods of operating the brakes.

To these and other related ends, my invention consists in the combination with the brakes associated with wheels of a motor vehicle, of power storing means carried by the vehicle and including members movable by the stored power, connections between said members and the non-rotating members of the brakes, and restraining means normally preventing the action of the stored power, said means being also carried by the vehicle, and being operable by a relatively slight expenditure of force exerted either by the operator or by automatic means such as an inertia weight which is moved by shock experienced by the vehicle.

My invention may be embodied in means utilizing the power of compressed air or power mechanically stored, as by a spring or a weight, all as hereinafter described.

Of the accompanying drawings forming a part of this specification:

Figure 1 represents a fragmentary view showing parts of a motor vehicle and brake-operating means utilizing the power of compressed air;

Fig. 2 represents a well-known form of band brake adapted to be operated by the means shown by Fig. 1;

Fig. 3 represents an enlargement of a portion of Fig. 1, a portion of the brake pipe being shown in section;

Fig. 4 represents a fragmentary view showing the secondary brake valve hereinafter described, located in its open position;

Figs. 5, 6 and 7 represents fragmentary sectional views illustrating different embodiments of my invention, utilizing the power of a spring;

Fig. 8 represents a section on line 8—8 of Fig. 7;

Figs. 9 and 10 represent fragmentary views illustrating an embodiment of the invention, in which the power is stored by means of a weight;

Fig. 11 represents a section on line 11—11 of Fig. 9;

Fig. 12 represents an end view looking toward the right-hand end of Fig. 9.

The same reference characters indicate the same or similar parts in all the views.

In the drawings, and referring first to Figs. 1 to 4 inclusive, 13 represents a portion of the chassis frame of a motor vehicle. 14 represents the drum or rotary member of the brake attached to one of the wheels 15 of the vehicle, and 16 represents the non-rotary member of the brake, here shown as a band embracing the drum 14, the ends of the band being pivoted to a lever 17, which is in turn pivoted at 18 to a suitable support.

19 represents a cylinder or air reservoir secured to brackets 20 attached to the frame 13. The cylinder has at one end a head 21 provided with a stuffing box 22 in which a piston rod 23 is fitted to slide. The inner end of said rod is secured to a piston 24 fitted to slide in the cylinder 19. The piston rod 23 constitutes a part of the connections made in accordance with my invention between the piston 24 and the brake shoe 16, said connections including a link 26 pivoted at 27 to the outer end of the piston rod and at 28 to the outer end of the lever 17.

The piston 24 subdivides the reservoir 19 into a storage portion 19ª and an outlet portion 19ᵇ. The storage portion receives air from an air pump 141, or other suitable source of supply on the vehicle, said pump being connected with the reservoir by a pipe line 29, which may be provided with a check valve at 30, to prevent back pressure of air through the pipe line.

The reservoir 19 is provided at the end opposite the head 21 with a head 31, through which extends a brake pipe 32 communicating with the outlet portion 19ᵇ. The brake pipe is provided with a brake valve 33 controlled by the operator, said valve being here shown as of the rotary plug type, the plug having an air passage 34 which, when the valve is open, communicates with an outlet 35 open to the atmosphere. The plug of the valve 33 may be provided with a hand-operated lever 36 or other suitable means whereby it may be opened by the operator. As here shown, the brake valve 33 is supported by a band 36ª clamped upon the steering post 37 of the vehicle.

The piston rod 23 extends through the storage portion 19ª of the reservoir, and by reason of its displacement of air in said portion renders the effective area of that side of the piston facing the storage portion less than that of the opposite side of the piston facing the outlet portion. A contracted vent 38 is provided, which maintains a constant communication between the storage and outlet portions of the reservoir. Said vent is preferably formed in the piston and is of much smaller capacity than the passage 34 of the brake valve.

When the brake pipe 32 is closed, air forced into the storage portion 19ª of the reservoir flows through the contracted vent 38 at a relatively slow rate. As soon as the air pressure is equalized in both portions of the reservoir, the piston moves toward the head 21 on account of the above described reduction of the effective area of one side of the piston by the rod 23, this movement releasing the brake. The brake-releasing movement is limited by complemental stop members 40 and 41, the member 40 being a collar adjustably secured to the piston rod by a screw 42.

When a stop is to be made the brake valve 33 is quickly opened by the operator, releasing air from the outlet portion 19ᵇ, the air flowing through the brake valve much more rapidly than through the vent 38, so that the pressure in the outlet portion drops immediately. The pressure in the storage portion therefore moves the piston suddenly inward, or in the direction required to apply the brake member 16 and stop the vehicle.

The air pressure in the storage portion of the reservoir may be regulated and controlled by a safety valve at the air pump, as indicated by Fig. 1, where the pump is indicated conventionally at 141 and the safety valve at 142. A regulated pull may therefore be exerted on the brake band of such force when the air pressure is at the maximum degree attainable by the operation of the pump, that the brakes will not lock the wheels, the object being to effect a graduated braking and thus prevent liability of skidding and of injury to the tires. It is recognized in railway practice that, if new surfaces are continually presented to the rails by allowing the wheels to turn while a train is being stopped, a better braking power is obtained. This principle holds good in the braking of a motor vehicle. By allowing the wheels to turn during the braking operation, extended surfaces of the tires are given to the road, with an increase of friction of the tires on the road and a consequent increase of braking power, and prevention of skidding and destructive wear of tires. Graduated braking may also be accomplished by suitable manipulation of the brake valve 33, the valve plug, when turned to a position intermediate its closed and fully opened positions so that the vent or air passage 34 is only partly in register with the pipe 32 and outlet 35, causing a less forcible application of the brakes than when the vent 34 registers fully with pipe 32 and outlet 35.

To release the brakes the brake valve 33 is closed, and the pressure in the storage and outlet portions of the reservoir is equalized by the accumulation, in the outlet portion, of air passing through the vent 38. The greater effective area of the side of the piston facing the outlet portion now causes the air pressure in the outlet portion to force the piston outwardly in the direction required to release the brakes.

The air pump is of greater capacity than the vent 38, consequently the brakes remain applied so long as the brake valve 33 remains open. Said valve may be provided with a closing spring, if desired, so that it will close automatically when released by the operator.

The brake-applying movement of the piston may be yieldingly checked or cushioned by a cushioning device, such as a buffer spring 45 (Fig. 1).

The adjustable stop collar or member 40 on the piston rod enables the outward or brake-releasing movement of the piston to be regulated by changing the position of the collar lengthwise of the piston rod.

The brake pipe 32 may be provided with two brake valves, viz., the valve 33, which may be called the primary valve, and a secondary valve adapted to be automatically opened to cause the application of the brake. Said secondary valve is provided, as here shown, by a nipple 46 on the brake pipe, said nipple containing a valve seat, and a valve piece 47, normally closed on the nipple valve seat by air pressure in the reservoir and provided with a protruding stem 48.

To automatically open the secondary valve I provide a lever fulcrumed at 49 and provided with oppositely projecting arms 50 and 51. To the lower arm 51 is connected by a bolt 52 an inertia weight 53, the gravitating action of which is such as to normally hold the upper arm 50 separated from the stem 48 of the secondary valve, and to hold a stop member 55 on the arm 51 against a fixed stop member 56.

The described lever and inertia weight are so arranged that when the vehicle experiences a sudden shock tending to cause the weight to be moved by its own inertia toward the left as viewed in Figs. 1 and 3, the stop member 55 leaves the fixed member 56, and the arm 50 strikes the stem 48 and opens the secondary valve, the result of such opening being the same as that of the opening of the first described or primary valve 33. The lever arm 50 is at the same time locked in its valve-opening position, as shown by Fig. 4, by a weighted pawl 58 pivoted at 59 to a fixed support, and remains locked until the pawl is displaced by the operator, through a wire or other connection 60.

The weight 53 is preferably adjustable horizontally on the lever arm 51, so that its center of gravity may be changed to increase or decrease the pressure of the stop member 55 against the fixed stop 56, and therefore require a greater or a lesser shock to displace the weight and lever. To this end the weight is provided with a horizontal row of holes 62 either of which may receive the bolt 52. Moving the weight 53 toward the front of the vehicle, or toward the left of Figs. 1 or 3, on the lever arm 51, will decrease the sensitiveness of the device, and moving the weight in the opposite direction will cause an increase in sensitiveness.

The inertia weight is so arranged that it loses its sensitiveness when the vehicle is going up hill, and has its sensitiveness increased when the vehicle is going down hill. The weight 53 must move forward relatively to the vehicle body in order to move lever 50, 51 to brake-operating position; but when the vehicle is mounting an incline and the forward end of the vehicle body is therefore higher than the rear, the force of gravity tends to carry the weight 53 and arm 51 farther toward the rear than their normal position. The force required, under this condition, then, to cause forward movement of the weight sufficient to move the lever to valve-operating position is the force that would be necessary for such purpose if the vehicle body were horizontal, plus force sufficient to overcome that which tends to carry the weight farther to the rear than when the body is horizontal. On the other hand, if the vehicle is descending an incline the force of gravity tends to carry the weight forward, and because of this tendency the force required to move the weight to carry the lever to valve-operating position is the force necessary for such purpose when the vehicle body is horizontal, minus that force which has already carried the weight to a position forward of that which the weight occupies when the vehicle body is horizontal.

Fig. 5 represents an embodiment of the invention in which power is stored by a spring 64, one end of which is seated on a holder or casting 65 attached to the vehicle frame. The other end of the spring is seated on an adjustable collar or nut 66 engaged with a screw-threaded portion of a rod 67, which is adapted to slide in the holder. The rod is provided at its outer end with a turnbuckle 68 forming an adjustable member of connections such as those shown by Figs. 1 and 2, between the rod and the brake member 16. When the spring is free to expand from a compressed condition, it moves the rod in the direction of the arrow and applies the brake.

The spring is restrained by means including a rack 69 forming a part of the rod 67, a pinion 70 journaled in the holder 65, and a pawl 71 engageable with teeth of the pinion. The pawl is pivoted at 72 to a lever 73, which in turn is pivoted at 74 to the holder. The pawl is prevented from swinging upward by the frame or holder 65. When the lever 73 is displaced upwardly from the position shown by Fig. 5, it withdraws the pawl 71 from engagement with the pinion 70, thus releasing the spring and permitting it to apply the brake. The lever may be displaced by the operator through a suitable pull device including a wire or cable 76. The spring may be set for action by a wrench applied to a squared shank 77 on the pinion 70, and operated to rotate the pinion and cause a spring-compressing movement of the rod through the rack, the pawl being then reëngaged with the pinion to restrain the spring. A casing 78, attached to the holder 65, excludes mud, dust, etc., from the spring.

Figs. 6, 7 and 8 illustrate a modification of the spring-actuated mechanism in which the parts corresponding to those shown by Fig. 5 are additionally designated by the exponent "a," as the spring 64ª, rack 69ª, pinion 70ª, etc. A lever 79 is mounted to oscillate loosely on the pinion 70ª, and is provided with a weight 80, said lever and weight constituting a pendulum.

The spring 64ª is restrained, when compressed, by a dog 81 pivoted at 82 to a lever 83, which in turn is pivoted at 84 to the holder 65ª. The relative arrangement of the pivots or centers 82 and 84 is such that when the lever 83 is in the position shown by Fig. 7, the dog 81 is raised from the rack 69ª, so that the spring is released. When the lever is in the position shown by Fig. 6, the dog 81 is depressed into engagement with teeth of the rack to restrain the spring. The lever 83 is provided with a stud 86 (Fig. 8) located in the path of movement of the pendulous lever 79. Said lever and its weight 80 are movable by the inertia of the weight in the event of a violent shock, the lever being swung against the stud 86 and moving the latter from the position shown by Fig. 6 to that shown by Fig. 7, thus releasing the spring 64ª and permitting it to apply the brake. The lever 83 is movable by the operator through suitable connections, which may include a lever 88 and a rod 89. Moving the weight 80 toward the left in Figs. 6 and 7 would have a tendency to cause the longitudinal median line of lever 79 to extend downwardly and rearwardly, but the upper end of the lever is provided with a stop portion 179 that abuts a stop member 192, and the coaction of these parts keeps the lever practically vertical, although the farther the weight 80 is placed to the left, the greater will be the inertia required to cause application of the brake.

The connections between the rod 67ª and the brake member 16 may include a block 90 attached to the pinion 70ª, and having a segmental face which is eccentric to the axis of the pinion, and a flexible strap 91 attached at 92 to the block 90 and at 93 to the brake lever 17.

The pendulous weight 80 and lever 79 constitute an automatic shock-operated means for releasing the spring.

Figs. 9, 10, 11 and 12 illustrate a different embodiment of the invention, in which power is stored in a weight 100 mounted on a lever 101. Said lever is attached to an eccentric 102 which is pivoted at 103 to the frame of the vehicle. The strap 104 of the eccentric is connected by suitable means such as a spring 105 and rod 106 with the brake lever 17.

The weight is restrained in the raised position shown by Fig. 9 by a detent 107 pivoted at 117 to the vehicle frame and engaging a lug 108 on the lever 101, and movable by the operator through suitable connections, including a wire or cable 109, to release the lever and weight. When the detent 107 is tripped the weight falls as shown by Fig. 10 and acts to apply the brake shoe.

The weight when raised is free to have a limited horizontal movement on the lever 101, its movement in one direction being positively limited by a stop shoulder 110 on the lever, and yieldingly held against said shoulder by a spring 111 on the lever. Antifriction balls 112 permit an easy movement of the weight on the lever against the pressure of the spring. A pawl 113 pivoted at 114 to the detent 107 engages a stud 118 (Fig. 12) on the weight. When the weight is thrown forward by a shock it acts through the pawl 113 to trip the detent. When the weight drops its stud 118 moves out of engagement with the pawl 113. A tether 115 limits the downward movement of the weight.

It will now be seen that each embodiment of the invention includes power-storing means carried by the vehicle and including a member such as the piston 24 (Fig. 1), the rod 67 (Fig. 5), the rod 67ª (Figs. 6 and 7), and the lever 101 and eccentric 102 (Figs. 9, 10 and 11) movable by the stored power, and restraining means carried by the vehicle and including a member such as either form of brake valve (Figs. 1 and 3), the pawl 71 (Fig. 5), the dog 81 (Fig. 8), and the detent 107 (Figs. 9 and 10), said restraining means normally preventing the action of the stored power, and being displaceable to permit such action.

My invention is intended as a quick acting brake-applying means coöperating with the usual brakes of a motor vehicle, and said brakes may be operated also by the usual hand or foot-controlling means.

I prefer to provide the brake bands 16 with oil cups 116 adapted to supply oil to the contacting surfaces of the band and drum. The oil thus supplied causes a smooth action of the brakes without locking the driving wheels. I consider this action very desirable in view of the heavy pressure exerted by the apparatus of my invention on the band members of the brakes.

Having described my invention, I claim:

1. The combination with a motor vehicle and brake therefor, of a movable power storing device, means for positively connecting said power storing device and said brake, whereby movement of the power storing device imparts a coextensive movement to the brake, means for normally preventing actuation of the power storing device, means for controlling said power storing device, and emergency means for automatically releasing said power storing device.

2. The combination with a motor vehicle and brake therefor, of a movable power storing device, means for positively connecting said power storing device and said brake, whereby movement of the power storing device imparts a coextensive movement to the brake, means for normally preventing actuation of the power storing device, means for controlling said power storing device, an emergency lever for automatically releasing said power storing device, and an inertia weight arranged to act on said lever when movement of the vehicle is suddenly arrested.

3. The combination with a motor vehicle and brake therefor, of a movable power storing device, means for positively connecting said power storing device and said brake, whereby movement of the power storing device imparts a coextensive movement to the brake, means for normally preventing actuation of the power storing device, means for controlling said power storing device, an emergency lever for automatically releasing said power storing device, and an inertia weight attached to said lever to actuate the same when movement of the vehicle is suddenly arrested.

4. The combination with a motor vehicle and brake therefor, of a movable power storing device, means for positively connecting said power storing device and said brake, whereby movement of the power storing device imparts a coextensive movement to the brake, means for normally preventing actuation of the power storing device, means for controlling said power storing device, an emergency lever for automatically releasing said power storing device, an inertia weight attached to said lever to actuate the same when movement of the vehicle is suddenly arrested, and means whereby said weight may be adjusted to hold the lever normally in inoperative position.

5. The combination with a motor vehicle and brake therefor, of a movable power storing device, means for positively connecting said power storing device and said brake, whereby movement of the power storing device imparts a coextensive movement to the brake, means for normally preventing actuation of the power storing device, a pivoted lever for controlling said power storing device, and means for limiting movement of said lever in one direction.

6. The combination with a motor vehicle and brake therefor, of a movable power storing device, means for positively connecting said power storing device and said brake, whereby movement of the power storing device imparts a coextensive movement to the brake, means for normally preventing actuation of the power storing device, means for controlling said power storing device, an emergency lever for automatically releasing said power storing device, an inertia weight arranged to act on said lever when movement of the vehicle is suddenly arrested, and means for locking said lever against movement after the power storing device has been released.

7. The combination with a motor vehicle and a brake therefor, of a fluid pressure power storing device, means for positively engaging said power storing device and said brake, whereby movement of the power storing device imparts a coextensive movement to the brake, a manually operable valve controlling the power storing device, an emergency valve also controlling said power storing device, and means for operating the emergency valve when forward movement of the vehicle is suddenly arrested.

8. In a motor vehicle, in combination, a brake, a storage reservoir carried by the vehicle, a piston movable by air pressure in said reservoir and dividing the reservoir into a storage portion and an outlet portion, connections between said piston and the non-rotating member of the brake, means carried by the vehicle for charging said storage portion with compressed air, the piston having a diminutive vent to permit equalization of the pressure in the storage and outlet portions of the reservoir when the outlet portion is closed, a brake pipe communicating with the outlet portion and provided with a primary and a secondary brake valve, the latter being normally closed by air pressure, means controlled by the operator for opening the primary valve, a lever fulcrumed on the vehicle and having an arm adapted to open the secondary valve, an inertia weight normally holding said lever in an inoperative position and operable when forward movement of the vehicle is suddenly arrested to move the lever and open the secondary valve, and a stop member arranged to limit movement of said lever from valve-closing position.

9. In a motor vehicle, in combination, a brake, a storage reservoir carried by the vehicle, a piston movable by air pressure in said reservoir and subdividing the reservoir into a storage portion and an outlet portion, the effective area of the piston at the side facing the storage portion being less than that at the side facing the outlet portion, connections between said piston and the non-rotating member of the brake, means carried by the vehicle for charging said storage portion with compressed air, a contracted vent being provided to equalize the pressure in the storage and outlet portions of the reservoir when the outlet portion is closed, a brake pipe communicating with the outlet portion and provided with a primary and a secondary brake valve, the latter being normally closed by air pressure, means controlled by the operator for opening the primary valve, a lever fulcrumed on the vehicle at a point adjacent to the secondary valve and having an arm adapted to open the secondary valve, an inertia weight normally holding said lever in an inoperative position and operable by a shock to move the lever and open the secondary valve, stop members coöperating to limit movement of said lever from valve-opening position, and a detent adapted to confine the lever in its valve-opening position, said detent being displaceable by an operator to release the lever.

In testimony whereof I have affixed my signature.

ISAAC H. DAVIS.